United States Patent [19]

Hotta et al.

[11] 4,389,711
[45] Jun. 21, 1983

[54] TOUCH SENSITIVE TABLET USING FORCE DETECTION

[75] Inventors: Masao Hotta, Hachioji; Yoshikazu Miyamoto, Kokubunji; Norio Yokozawa, Fuchu; Yoshimitsu Oshima, Tokyo, all of Japan

[73] Assignee: Hitachi, Ltd., Tokyo, Japan

[21] Appl. No.: 177,058

[22] Filed: Aug. 11, 1980

[30] Foreign Application Priority Data

Aug. 17, 1979 [JP] Japan .................. 54-104007
Sep. 19, 1979 [JP] Japan .................. 54-119420

[51] Int. Cl.³ .............................................. G08C 21/00
[52] U.S. Cl. .................................. 364/556; 73/1 B; 73/862.38; 178/18; 364/508; 364/731
[58] Field of Search ..................... 364/191–193, 364/474, 556, 508, 517, 522, 731, 506; 73/1 B, 862.38, 862.45, 862.54; 340/706, 384 E, 365 A, 365 C; 178/18; 177/211

[56] References Cited

U.S. PATENT DOCUMENTS

| | | | |
|---|---|---|---|
| 3,616,690 | 11/1971 | Harden | 177/211 |
| 3,657,475 | 4/1972 | Peronneau et al. | 178/18 |
| 3,727,002 | 4/1973 | Pear, Jr. | 178/18 |
| 3,875,331 | 4/1975 | Hasenbalg | 178/18 |
| 4,051,721 | 10/1977 | Williams | 73/862.38 |
| 4,094,192 | 6/1978 | Watson et al. | 73/1 B |
| 4,121,049 | 10/1978 | Roeber | 178/18 |
| 4,145,748 | 3/1979 | Eichelberger et al. | 340/365 C |
| 4,293,734 | 10/1981 | Pepper, Jr. | 178/18 |

OTHER PUBLICATIONS

Lisk, "Electronic Keyboard"; IBM Tech. Discl. Bull.; vol. 20, No. 1; Jun. 1977; p. 259.
Fajans, "Acoustical Touch Panel"; IBM Tech. Discl. Bull.; vol. 20, No. 7; Dec. 1977; p. 2925.

Primary Examiner—Errol A. Krass
Attorney, Agent, or Firm—Antonelli, Terry and Wands

[57] ABSTRACT

A tablet comprising conversion means to convert component forces at three fulcra of an external force applied to one point on a faceplate into electric signals, sensing means to sense that no external force is applied, memory means to store the output signals of the conversion means at the respective fulcra as offset values at, at least, one point of time in the period in which no external force is applied, control means to control so as to execute writing into the memory means upon receiving an output of the sensing means, subtraction means to subtract outputs of the memory means from the outputs of the conversion means at the respective fulcra, and calculation means to execute calculations for evaluating coordinates of the point to which the external force has been applied, from outputs of the subtraction means in accordance with the output of the sensing means.

11 Claims, 12 Drawing Figures

TOUCH SENSITIVE TABLET USING FORCE DETECTION

BACKGROUND OF THE INVENTION

1. Field of the Invention

This invention relates to a touch sensitive tablet using force detection (hereinbelow, called "touch panel") which serves to select items indicated on a faceplate such as display panel when combined with a display device or to apply patterns to a computer system etc.

2. Description of the Prior Art

There has been known a method wherein the component forces of a touch at three supporting points on a faceplate are converted into electric signals by means of force detectors disposed at the respective supporting points, and the electric signals are subjected to predetermined calculations, thereby to find the coordinates of a touched point on the faceplate. (cf: Japanese Patent Application Publication No. 49-34247)

In case of finding the coordinates of the touched point with this method, a strain gauge, a piezoelectric element or the like is employed as the force detector. After the electric signals corresponding to the component forces at the respective fulcra have been subjected to the necessary analog processings of amplification, shaping etc., the coordinates are evaluated by means of an analog calculator. It is also possible that the electric signals subjected to the necessary analog processings of amplification, shaping etc. are converted into digital signals by means of an analog-to-digital converter (hereinbelow, abbreviated to "ADC"), whereupon the coordinates are evaluated with the digital signals by means of a digital calculator (such as digital computer).

In this case, the calculated values of the coordinates fluctuate due to, not only noise in the force detectors and amplifiers, noise and calculation errors in the calculator, quantization errors in the ADC, etc., but also outputs of the force detectors in the untouched state (offset values).

Heretofore, regarding the fluctuations of the calculated values ascribable to the noise, calculation errors etc. of the various circuits, circuits of low noise and high precision have been used. This has led to the problem that the cost of the apparatus increases. Regarding the fluctuations of the calculated values ascribable to the offset values, since the offset values vary with time due to a temperature rise etc., they have been measured and corrected at suitable intervals. This has resulted in the problem that the coordinate inputs must be interrupted every interval of the measurement of the offset values.

SUMMARY OF THE INVENTION

An object of this invention is to provide a tablet which solves the above-mentioned problems and which can evaluate the coordinates of a touched point at high precision.

In order to accomplish the object, according to this invention, the outputs of force detectors immediately before applying a weight as a touch are registered as offset values to be compensated for, and by exploiting the fact that after the application of the weight, the fluctuations of calculated coordinate values ascribable to noise, calculation errors etc. in various circuits decrease with the increase of the weight, calculations for finding the coordinates of a touched point are started after the applied weight has reached a predetermined value.

DETAILED DESCRIPTION OF THE PREFERRED EMBODIMENTS

First of all, the principle on which the coordinates of the applied point of a weight are evaluated with a touch panel will be described with reference to FIG. 1.

Figure 1:
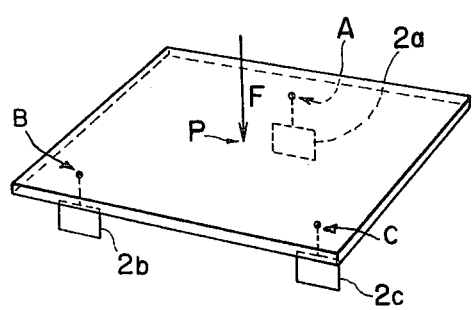
FIG. 1 is a view showing the operating principle of a touch panel.

In FIG. 1, when a force F in a direction perpendicular to a faceplate 1 is applied with a finger or writing instrument to a point P on the faceplate 1 made of a rigid body such as glass plate, fulcra A, B and C on the lower side of the faceplate 1 undergo component forces $f_a$, $f_b$ and $f_c$ corresponding to the positions (A, B, C). The coordinates of the point P can therefore be evaluated by detecting the component forces in force detectors 2a, 2b and 2c disposed at the respective fulcra.

Letting A $(x_a, y_a)$, B $(x_b, y_b)$ and C $(x_c, y_c)$ denote the coordinates of the fulcra A, B and C within the faceplate 1, the coordinates (X, Y) of the point P can be evaluated by the following expressions:

$$X = \frac{x_a f_a + x_b f_b + x_c f_c}{f_a + f_b + f_c} \quad (1)$$

$$Y = \frac{y_a f_a + y_b f_b + y_c f_c}{f_a + f_b + f_c} \quad (2)$$

Accordingly, in case where the touch panel carries out the item selection in combination with a display device such as CRT, the coordinates of the finger can be evaluated from the above expressions, and which item has been selected can be known by applying the coordinates to a computer system.

Now, errors at the time when the coordinates (X, Y) are obtained with the expressions (1) and (2) in accordance with this invention will be classified into errors ascribable to the offset values of the force detectors and errors in a series of signal processors for the output electric signals of the force detectors and will be described in detail together with coordinates calculators free from the errors.

(i) Errors ascribable to Offset Values of Force Detectors

Usually, the forces at the respective fulcra are converted into electric signals by employing strain gauges, piezoelectric elements or the like as the force detectors, and after amplification etc., the values X and Y are obtained by means of an analog calculation or by means of a digital calculation after A/D conversion.

As apparent from Expressions (1) and (2), the absolute values of the forces $f_a$, $f_b$ and $f_c$ are not required, but the values X and Y are obtained by measuring the proportional relations thereof. Accordingly, the output of each force detector may be proportional to the applied force. In general, however, the output v of the force detector responsive to the applied force f is not simply proportional to f but includes an offset component $v_o$. That is, $$v = kf + v_o \text{ (k being a constant)} \qquad (3)$$

The offset component $v_o$ becomes one of causes for errors in Expressions (1) and (2).

There are various factors for the offset, and typical ones are as follows.

One is the influence of the weight of the panel itself. When the touch panel is installed, it is not always placed on a horizontal plane, but it is sometimes disposed aslant. By way of example, in case of using the touch panel in the state in which it is mounted on the front surface of the CRT display device, it is sometimes installed in a vertical position. The influence of the weight of the panel itself acting on the force detector differs depending upon the installation angle of the panel. However, once the panel has been installed and fixed, it will not be moved frequently, and hence, the error attributed to the weight of the panel itself becomes a fixed offset component.

Another factor is a change in the characteristic of the force detector due to a temperature change (that is, temperature drift). The values k (corresponding to the sensitivity of the force detector) and $v_o$ in Expression (3) vary due to the temperature change. Even when k fluctuates due to the temperature change, the fluctuations of k are equal on the assumptions that the characteristics of the respective force detectors have no deviation and that the temperature changes in the force detectors 2a, 2b and 2c at the three places are nearly equal. As long as the linearity is not spoiled, the proportional relationship is held as it is, and hence, the fluctuations of k do not affect the results of Expressions (1) and (2). In contrast, the temperature fluctuation of $v_o$ becomes a factor for the error as a temperature change component of the offset. The offset attributed to the temperature drift becomes a considerable magnitude when the strain gauge or the like is used as the force detector.

Besides, as factors for the offset, there are a secular change etc.

In general, the error due to the offset can be treated as an error which is contained fixedly in a measuring instrument or an error which varies slowly over a long time. Therefore, before the force F is applied, the outputs of the force detectors 2a, 2b and 2c are measured and are stored as offset values, and when the force F is applied, the offset values are subtracted from the outputs of the respective force detectors, whereby measured values properly proportional to the respective component forces $f_a$, $f_b$ and $f_c$ of the force F are obtained. Then, the timing when the offset values are to be measured is the next problem. In other words, it is necessary to discriminate the state under which the force F is applied and the state under which it is not applied and to adopt as the offset values the output of the force detectors measured which the force F is not applied.

As one method for distinguishing the states, there is a method wherein the operation mode of the touch panel is divided into two; an offset measurement mode and a coordinates input mode and wherein the measurement of the offset is performed in the offset measurement mode. In this case, when the touch panel is in the offset measurement mode, the user of the touch panel needs to be notified of the fact by any method so as to cease the coordinates input operation during the mode. The notification can be simply made by the lamp indication or the like. Since, however, the offset values vary with time due to a temperature rise etc., they need to be corrected periodically at suitable intervals. At the offset measurement mode, the coordinates input operation must be interrupted, which is very troublesome for the user of the touch panel.

In this invention, therefore, means to discriminate whether the force F is applied or not applied is provided and the offset values are measured while the force F is not applied. These measured values are used for offset compensation at the time when the force F has been applied.

Concretely, while the force F is not applied the outputs of the respective force detectors or the offset values are periodically measured, and on the basis of the measured values, the offset values which have already been stored are renewed. Upon application of the force F, the measurement of the offset is interrupted by the means for discriminating it, and the respective offset values are subtracted from the outputs of the force detectors so as to obtain the actual component forces, with which the coordinates are calculated in accordance with Expressions (1) and (2).

In this manner, according to the present invention, the measurements of the offset values and the compensations thereof can be made without giving the user of the touch panel any trouble.

Hereunder, embodiments will be described in detail.

A method of sensing the application of the force F is broadly classified into two types. One is a method wherein the application is sensed from the output itself of the force detector, and the other is a method wherein it is sensed by means different from the output of the force detector.

Figure 2:
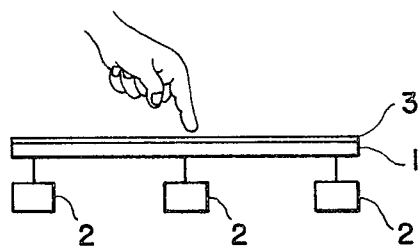
FIG. 2 is a view showing a section of the touch panel in FIG. 1.

FIG. 2 is a sectional view of an embodiment of the touch panel which employs the latter method. Numeral 1 designates a faceplate which is made of a rigid body such as glass as in FIG. 1, numeral 2 a force detector, and numeral 3 a conductive film which is stuck on the surface of the faceplate 1.

Usually, hum based on a commercial power frequency is induced in human bodies inside buildings in cities. Therefore, when the finger of a human being or the like is employed as a source of the force F to be applied, the hum of the human body is transmitted to the conductive film 3 upon touch of the finger tip or the like with the surface of the faceplate 1 or the conductive film 3. By detecting the hum, accordingly, it can be detected that the finger tip has touched the faceplate 1, i.e., that the force F has been applied. When the touch panel is used with the display device, a transparent film may be employed as the conductive film 3.

Figure 3:
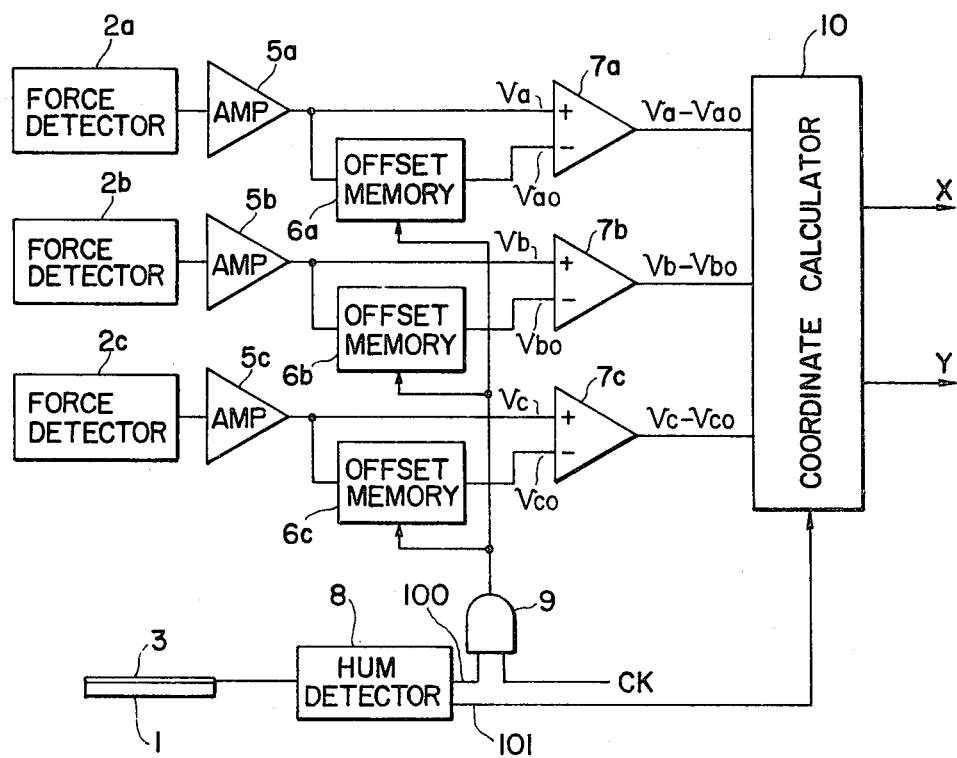
FIG. 3 is a diagram showing the circuit arrangement of a first embodiment of this invention.

FIG. 3 shows an offset compensation circuit at the time when the touch panel in FIG. 2 is used. Reference characters 2a, 2b and 2c indicate force detectors, and parts 5a, 5b and 5c carry out signal processings such as amplification and waveform shaping. Reference characters 6a, 6b and 6c indicate memory circuits which hold the offset values of the corresponding force detectors. When the finger tip or the like is not in touch with the touch panel 1, an output 100 of a hum detector 8 is logic "1", and a clock signal CK of fixed period is supplied to the offset hold circuits 6a, 6b and 6c through a gate circuit 9. In conformity with the clock signal, the respective offset hold circuits receive the outputs of the amplifiers 5a, 5b and 5c and renew the offset values in succession. When the finger tip or the like has touched the touch panel 1 (that is, the force F has been applied), the hum induced in the human body is transmitted to the hum detector 8 through the conductive film 3. Upon detecting the hum, the hum detector 8 puts the output 100 into logic "0" and disables the gate circuit 9. Accordingly, the clock signal CK is not supplied to the offset hold circuits, and the renewal of the offset values is interrupted.

On the other hand, the component forces which have developed in the respective fulcrum A, B and C of the faceplate 1 are detected by the force detectors 2a, 2b and 2c and are converted into electric signals $v_a$, $v_b$ and $v_c$ by the amplifiers 5a, 5b and 5c. Reference characters 7a, 7b and 7c indicate subtracters, which subtract the offset values $v_{ao}$, $v_{bo}$ and $v_{co}$ from the electric signals $v_a$, $v_b$ and $v_c$. These offset values have been received at the immediately preceding time, and the subtractors 7a, 7b and 7c create electric signals $v_a-v_{ao}$, $v_b-v_{bo}$ and $v_c-v_{co}$ which are corrected signals proportional to the component forces.

On the other hand, the hum detector 8 supplies a strobe signal 101 to a coordinate calculator 10 at the time when the force F is applied to the touch panel 1. Upon receiving the strobe signal, the calculator 10 executes the calculations indicated by Expressions (1) and (2) on the basis of the outputs of the subtracters 7a, 7b and 7c and delivers the coordinate values X and Y. As the hum detector 8, a known circuit used in the touch channel of a TV receiver or the like may be employed.

Figure 4:
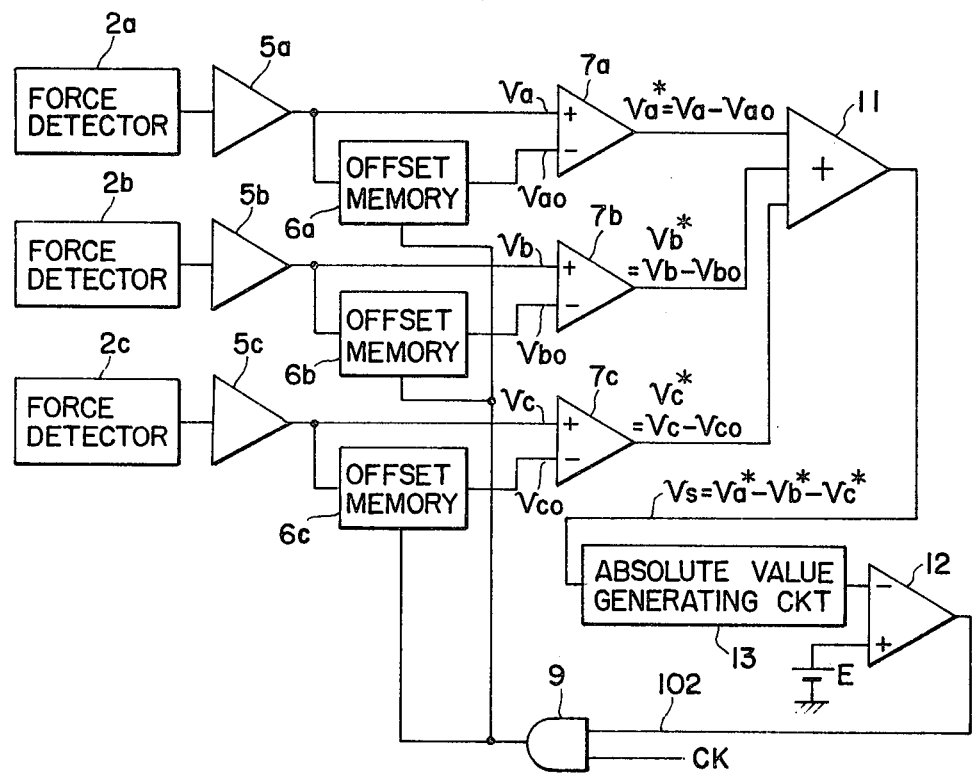
FIG. 4 is a diagram showing the circuit arrangement of a second embodiment of this invention.

Now, there will be described a method wherein the application of the force F is detected from only the force detectors so as to compensate for the offset. FIG. 4 shows an embodiment of the method.

It seems natural at a glance that the application of the force F is detected from the force detectors. In actuality, however, the detection is not so simple and a circuit as shown in FIG. 4 is required therefor. More specifically, the offset value does not always become a small value but can sometimes become the same extent as the applied force. For example, this applies to the offset value developing under the influence of the weight of the panel itself, and also the offset value developing due to the temperature drift of the force detector has the possibility of becoming the same extent. In such cases, whether or not the force F is applied cannot be discriminated from only the outputs of the force detectors.

In FIG. 4, 2a..., 5a..., 6a..., 7a... and 9 indicate force detectors, amplifiers, offset memory circuits, subtracters and a gate circuit, respectively, as in FIG. 3. Likewise to the case of FIG. 3, when the hand is not in touch with the touch panel 1, the input signal 102 of the gate 9 is in the logic "1" state, and the clock signal CK of fixed period is supplied to the offset memory circuits 6a, 6b and 6c through the gate circuit 9. Upon receiving the clock signal, the respective offset memory circuits renew the offset values in succession by utilizing the outputs of the amplifiers 5a, 5b and 5c. Accordingly, while the force F is not applied, the outputs of the subtracters 7a, 7b and 7c consist only of the offset components and are substantially zero.

Subsequently, when the force F is applied to the touch panel 1, the electric signals $v_a-v_{ao}$, $v_b-v_{bo}$ and $v_c-v_{co}$ which are correctly proportional to the corresponding component forces appear at the outputs of the subtracters 7a, 7b and 7c as the results obtained by subtracting the offset values, as in the case of FIG. 3. These outputs are summed up in an adder 11. In consequence, an output $v_s$ of the adder 11 is a value which is properly proportional to the force F applied to the touch panel. The output $v_s$ of the adder 11 has its absolute value found by an absolute value generating circuit 13, and the absolute value is supplied to a comparator 12 and is compared with a predetermined electric signal E. The signal E is a threshold value for discriminating the output signal owing to the force F and the offset, and is set at an appropriate value on the basis of the magnitude of the force to be applied, the characteristics of the offset, the sensitivity of the force detector, etc.

When the force F is not applied, that is, when $|v_s|<E$, the output of the comparator 12 is at logic "1", the clock signal CK passes through the gate circuit 9 and the contents of the offset hold circuits are successively renewed.

When the force F has been applied, that is, when $|v_s|>E$ has been established, the output of the comparator 12 becomes logic "0", the gate circuit 9 is turned "off" and the renewal of the offset values is interrupted. This state continues during the application of the force F, and the offset memory circuits 6a, 6b and 6c hold values immediately before the application of the force F.

Although not illustrated in FIG. 4, the timing at which the output of the comparator 12 turns from logic "1" to logic "0" is transmitted to the coordinate calculator (10 in FIG. 3) as in FIG. 3. Upon receiving the timing signal, the calculator calculates the coordinates by using the outputs of the subtracters 7a, 7b and 7c and also the output of the adder 11 in some cases.

Figure 5:
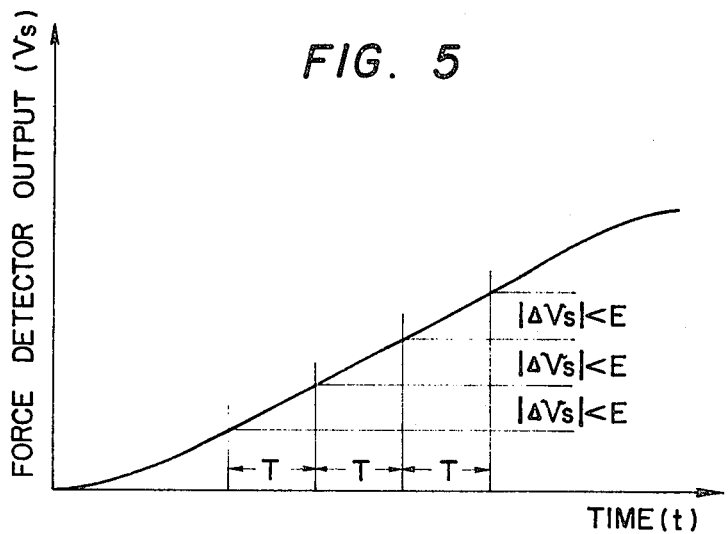
FIG. 5 is a graph showing an example of the time variation of an output signal of a force detector.

In the present embodiment, depending on the values of the threshold voltage E of the comparison and the period of the clock signal CK, the expected result is not always obtained. For example, as shown in FIG. 5, the variation of the applied force F is slow, and the quantity of variation of the force detector output within one clock period T does not become greater than the threshold voltage E of the comparison in some cases. At this time, notwithstanding that the force F has been applied, the contents of the offset memory circuits are successively renewed in response to the variation of the force F, and the circuits hold values which are inappropriate as the offset values. It is considered that such situation will scarcely occur by suitably setting the threshold voltage E of the comparison and the period of the clock signal CK in advance. However, when such situation has incidentally occurred, the touch panel conducts a malfunction, which is undesirable.

In addition, at the beginning of the application of the force F, the rise of the output which develops in each force detector is slow in relation to the inertia of the faceplate 1, etc. Supposing that the clock signal has entered at this time to correct the offset, the resultant offset value is not originally correct and forms a factor for degrading the precision of the touch panel.

Figure 6:
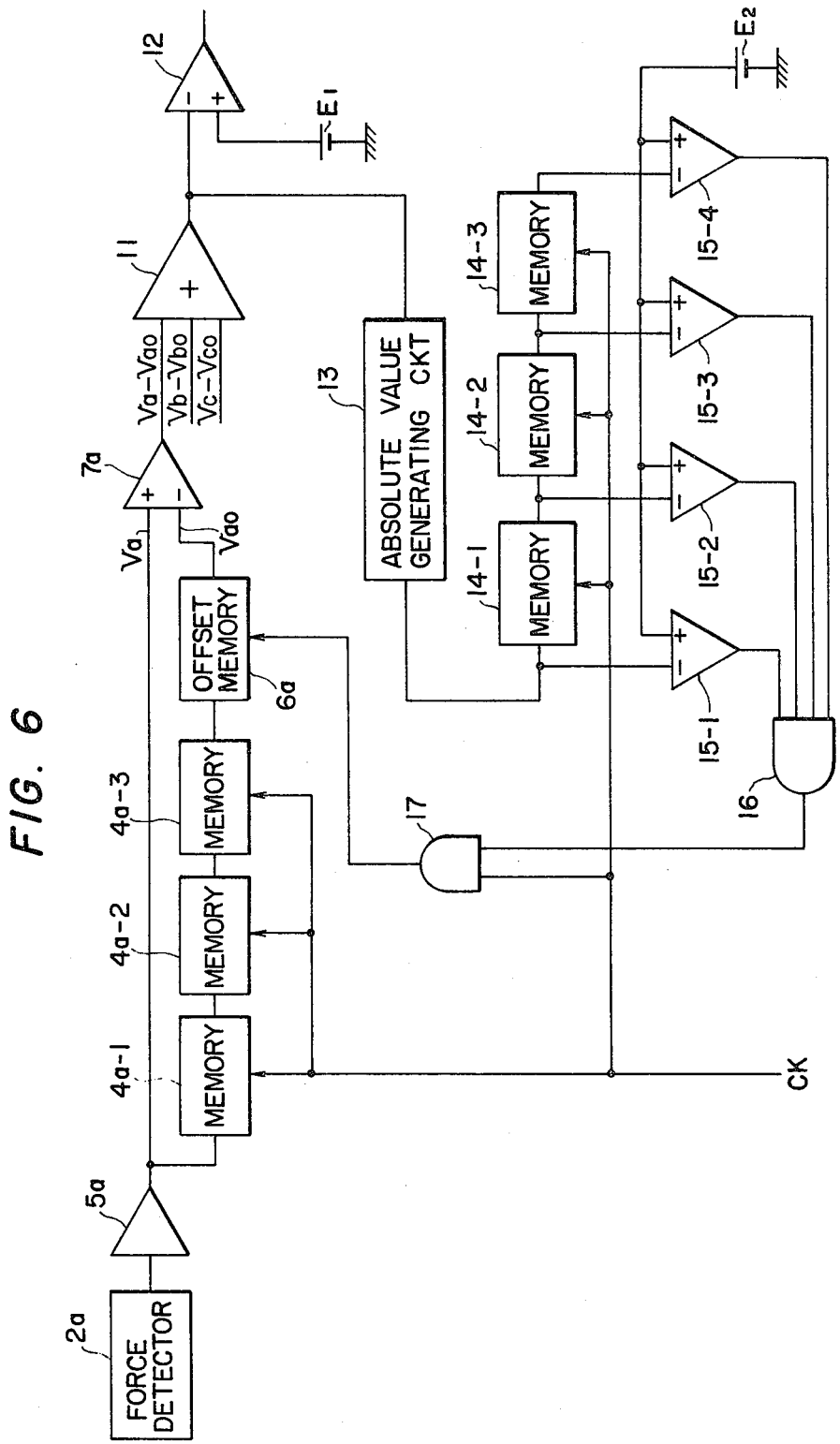
FIG. 6 is a diagram showing the circuit arrangement of a third embodiment of this invention.

An embodiment for avoiding the drawback is shown in FIG. 6. In FIG. 6, only a circuit corresponding to the fulcrum A among the three fulcra in FIG. 1 and a common circuit are shown, and circuits concerning the fulcra B and C are omitted because they are quite the same as the circuit for the point A.

The difference between the present embodiment and the embodiment of FIG. 4 is that, whereas the case of FIG. 4 forms the decision from only the present output value, the present embodiment utilizes a plurality of outputs by going back to the past. More specifically, whether or not all the plurality of outputs in the past lie within a certain range of fluctuations ($E_2$ in FIG. 6) is decided, and the renewal of the offset value is effected only when this condition has been fulfilled. When there is a doubt even slightly, the renewal of the offset value is rejected so as to prevent an erroneous offset value from being formed.

The output of the absolute value generating circuit 13 is introduced into memory circuits 14-1, 14-2 and 14-3, the contents of which are successively shifted in synchronism with the clock signal CK. The direct output of the absolute value generating circuit 13 and the outputs of the memories 14-1, 14-2 and 14-3 are respectively led to comparators 15-1, 15-2, 15-3 and 15-4 and are compared with the criterion $E_2$ of the comparisons. When the direct output of the absolute value generated by circuit 13 and the outputs of the memories 14-1, 14-2 and 14-3 are smaller than $E_2$, the output of an AND circuit 16 becomes logic "1". At this time, a gate circuit 17 falls into the conductive state, the clock signal CK is fed to the offset hold circuit 6a and the offset value is renewed. Owing to the provision of the memories 14-1 to 14-3, in case where a pulse noise whose amplitude is greater than $E_2$ and whose duration is shorter than the clock period has appeared at the output of the force detector 5a, it appears at the input end of the offset hold circuit 6a after three clocks, but it simultaneously appears at the output end of the memory 14-3 to render the output of the comparator 15-4 logic "0", so that the pulse noise can be prevented from entering the offset hold circuit 6a as an offset value in response to the next clock. Reference characters 4a-1, 4a-2 and 4a-3 indicate memory circuits, which receive the output of the amplifier 5a and successively shift the contents in synchronism with the clock signal CK. They serve to prevent the degradation of the accuracy attributed to the reception of the erroneous offset value at the rise upon the application of the force F as stated previously, and are disposed with the intention of using the offset value from the oldest one, namely, from the smallest possible output component based on the force F. However, from the viewpoint that if all the outputs of the memories 4a-1, 4a-2 and 4a-3 are below the threshold value $E_2$ (that is, all the outputs of the memories 14-1, 14-2 and 14-3 are below $E_2$) any may be used as the offset value, the present output of the amplifier 5a at which the output of the coincidence circuit 16 becomes zero may well be adopted as the correct offset value as it is. In that case, this portion may well be omitted.

While only one threshold value has been provided in FIG. 4, the two threshold values $E_1$ and $E_2$ are provided in the present embodiment. Therefore, the threshold value $E_1$ can be employed for sensing the force F, and $E_2$ as the threshold value for determining whether or not the offset is to be renewed, and a finer control becomes possible.

Although only three stages are prepared and illustrated as each memory device, this is for facilitating the explanation, and the period of the clock signal and the number of stages of the memory device need to be determined according to the characteristics of the offset.

As illustrated in the present embodiment, any offset which varies slowly over a long time can be detected and corrected by the circuit of FIG. 6. Further, it is permitted to prevent the reception of the erroneous offset value.

As stated at the beginning, however, the offset attributed to the weight of the faceplate 1 itself cannot be avoided with the circuit of FIG. 6 in some cases. More specifically, in case where the touch panel is used at an installation angle different from its installation angle till then, the offset value due to the weight of the faceplate 1 itself varies greatly and exceeds the value $E_2$ in FIG. 6. If the offset value is thereafter left as it is, the output of the AND circuit 16 will permanently remain "0", and the content of the offset hold circuit will remain unrenewed.

Figure 7:
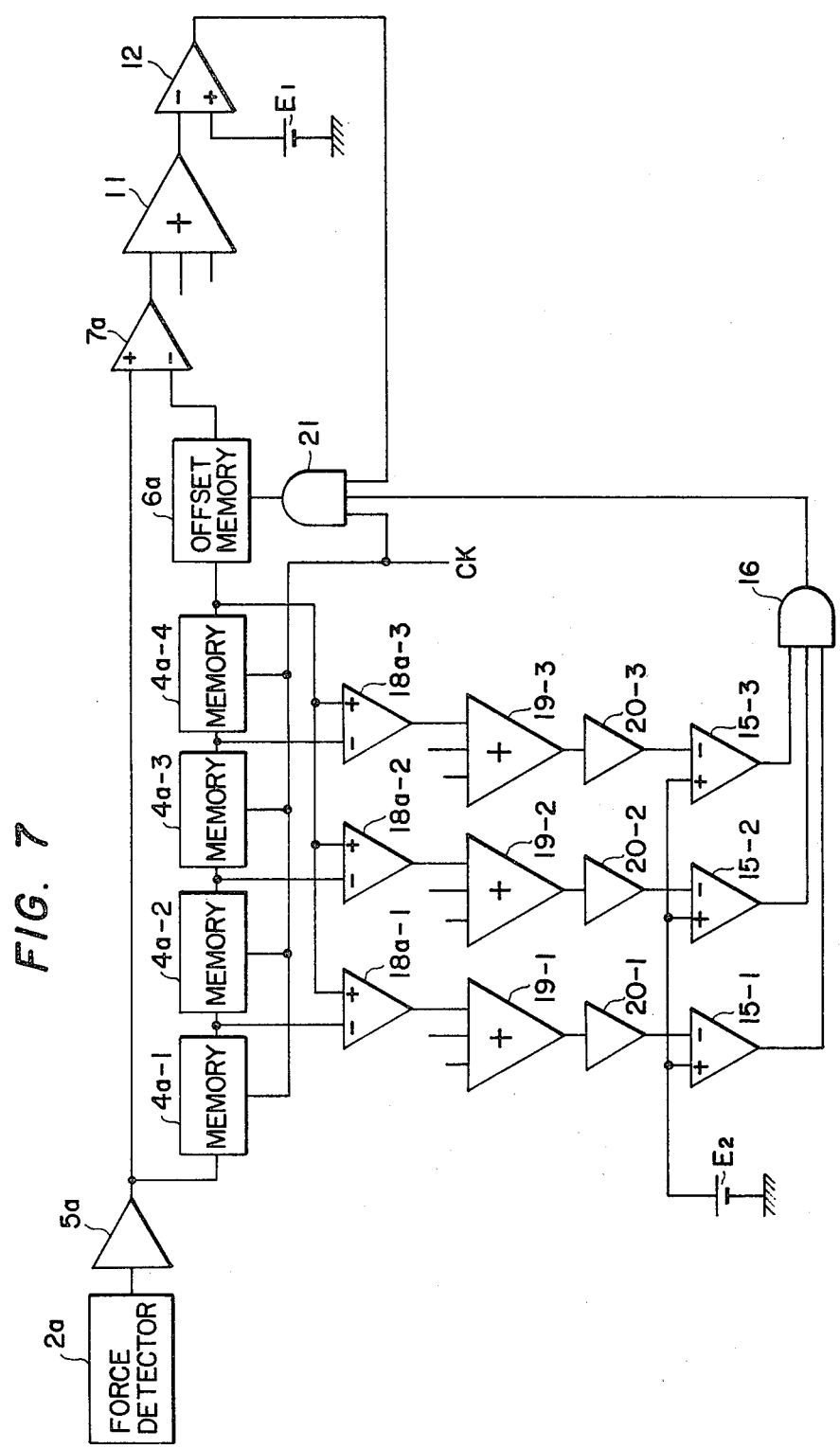
FIG. 7 is a diagram showing the circuit arrangement of a fourth embodiment of this invention.

An embodiment of a circuit for overcoming this drawback is shown in FIG. 7. Similarly to FIG. 6, the present figure illustrates only a circuit corresponding to the fulcrum A among the three fulcra and a common circuit, and it omits circuits corresponding to the fulcra B and C because they are the same as the circuit for the fulcrum A.

The embodiment in FIG. 6 has formed the decision on receiving the offsets, depending on whether or not all of the absolute values which are the summations of the differences between the offset values received as reference ($v_{ao}$, $v_{bo}$, $v_{co}$) and the outputs of the force detectors at the plural points of time are below the fixed value $E_2$. In contrast, the present embodiment forms the decision on the basis of the summation of the differences among the outputs of the force detectors at a plurality of points of time.

In FIG. 7, 4a-1, 4a-2, 4a-3 and 4a-4 indicate memory circuits as in FIG. 6. The outputs of these circuits are fed into subtracters 18a-1, 18a-2 and 18a-3 so as to evaluate differences among them. In the embodiment of FIG. 7, the differences between the outputs of the memory circuits 4a-1, 4a-2, 4a-3 and the input of the memory circuit 6a (oldest offset value) at the respective points of time and the oldest are evaluated by the subtractors 18a-1, 18a-2 and 18a-3. In general, however, the differences of the outputs may well be evaluated for all the combinations $$\left( \frac{n(n-1)}{2} \right)$$

in which two outputs different from each other are selected from among n outputs. The subtraction results at the fulcra A, B and C are added by adders 19-1, 19-2 and 19-3 and put into absolute values by absolute value generating circuits 20-1, 20-2 and 20-3 at the respective points of time, whereupon the absolute values are compared with the threshold value $E_2$. When all these absolute values are smaller than the threshold value $E_2$, the output of the AND circuit 16 becomes logic "1". At this time, if also the output of the comparator 12 is logic "1", a gate circuit 21 falls into the conductive state, the clock signal CK is supplied to the offset memory circuit 6a and the renewal of the offset value is performed. The comparative reference value $E_1$ of the comparator 12 serves to decide whether the input of the force F has been made. When the force F has been applied, that is, when the output of the adder 11 has become greater than $E_1$, the output of the comparator 12 becomes logic "0". This serves to prevent the offset value from being renewed while the output of each force detector becomes metastable with the force F kept applied, that is, which the variation of the force F is small in spite of the application thereof, all the outputs of the absolute value generating circuits 20-1, 20-2 and 20-3 become smaller than the threshold value $E_2$.

Although omitted on the drawing in both the embodiments of FIGS. 6 and 7, the timing at which the output of the comparator 12 turns from logic "1" to logic "0" is transmitted to the coordinate calculator to execute the calculations given in Expressions (1) and (2) likewise to the embodiment of FIG. 4.

All of the embodiments represented in FIGS. 4, 6 and 7 have been described on the system wherein the summation of the respective outputs at the fulcra A, B and C is taken. In this regard, however, a system wherein the magnitudes are checked at the individual fulcra and wherein a logical AND of the results is taken is also possible.

In the embodiments of FIGS. 6 and 7, especially in the embodiment of FIG. 7, large numbers of comparators, subtracters etc. are required. However, when they are used in time division by the use of switching circuits, the scale of the circuit arrangement can be reduced. There may well be used a system wherein the summation of the outputs of the subtracters disposed at the respective fulcra is not compared with the threshold value as in the embodiments of FIGS. 3, 4, 6 and 7, but the outputs of the respective subtracters are compared with the threshold value and whether or not at least one subtracter output has exceeded the threshold value is detected.

(ii) Errors in Signal Processors

Figure 8:
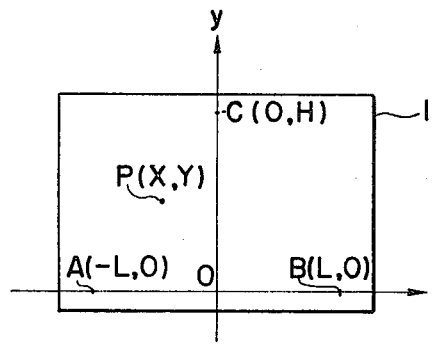
FIG. 8 is a diagram exemplifying the positional coordinates of an applied point of a force and three supporting points.

When, for the sake of brevity, the coordinates of the three fulcra (A, B, C) in FIG. 1 are assumed to be A $(-L, O)$, B $(L, O)$ and C $(O, H)$ as shown in FIG. 8, Expressions (1) and (2) become as follows:

$$X = \frac{f_b - f_a}{f_a + f_b + f_c} \cdot L \tag{4}$$

$$Y = \frac{f_c}{f_a + f_b + f_c} \cdot H \tag{5}$$

Here, errors which include noise, calculation errors etc. in a series of signal processors are let be $\Delta f_a$, $\Delta f_b$ and $\Delta f_c$ in terms of the forces to be referred to the input sides of the force detectors (respective component force; $f_a$, $f_b$ and $f_c$), respectively. Putting $\Delta f_2 = \Delta f_a + \Delta f_b$, $\Delta F = \Delta f_a + \Delta f_b + \Delta f_c$ and $F = f_a + f_b + f_c$, $$X + \Delta X = \frac{f_b - f_a + \Delta f_2}{F + \Delta F} \cdot L \tag{6}$$

-continued $$Y + \Delta Y = \frac{f_c + \Delta f_c}{F + \Delta F} \cdot H \tag{7}$$

From Expressions (4)–(7), errors $\Delta X$ and $\Delta Y$ representative of the variations of X and Y become as follows:

$$\Delta X \approx \frac{\Delta f_2}{F} \cdot L - \frac{(f_b - f_a + \Delta f_2)\Delta F}{F^2} \cdot L \tag{8}$$

$$\Delta Y \approx \frac{\Delta f_c}{F} \cdot H - \frac{(f_c + \Delta f_c)\Delta F}{F^2} \cdot H \tag{9}$$

Thus, it is understood from Expressions (8) and (9) that the force F to be applied may be made great in order to lessen the errors $\Delta X$ and $\Delta Y$.

That is, $\Delta X$ and $\Delta Y$ ought to be brought into a specified error in such a way that the calculations for evaluating X and Y according to Expressions (4) and (5) are started after the force F applied to the point P in FIG. 1 has reached a predetermined magnitude.

Hereunder, embodiments will be described in detail.

Figure 9:
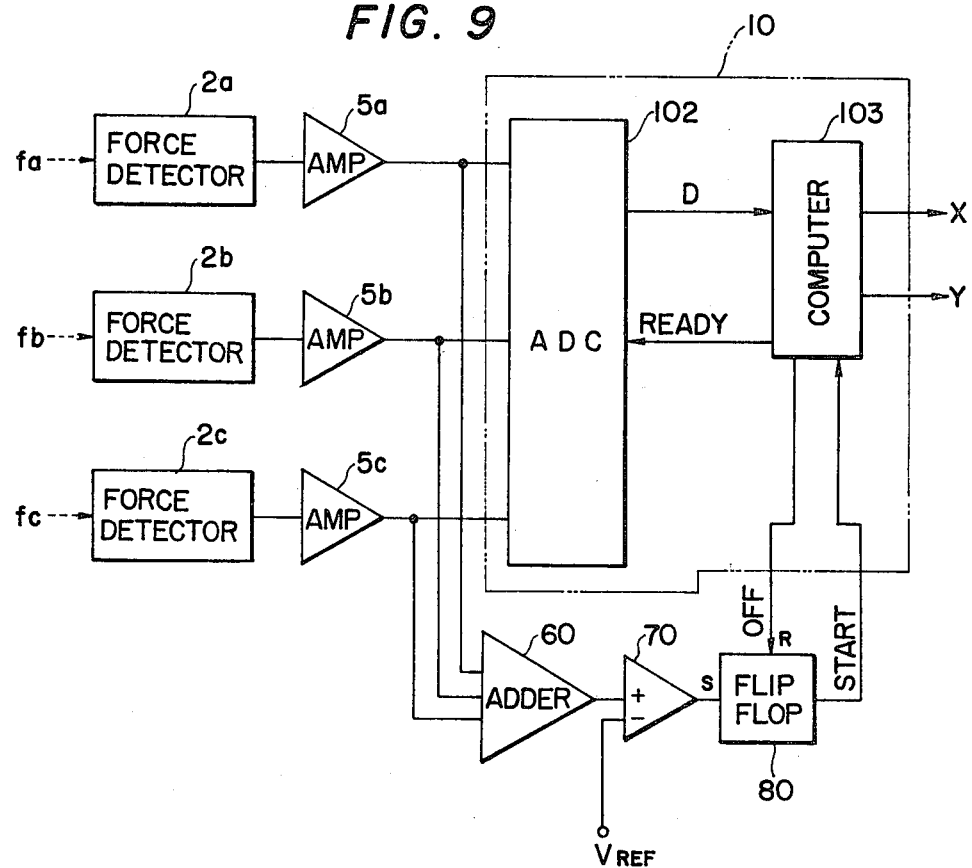
FIG. 9 is a diagram showing the circuit arrangement of a fifth embodiment of this invention.

FIG. 9 is a circuit diagram showing a fifth embodiment of this invention.

Referring to FIG. 9, the component forces $f_a$, $f_b$ and $f_c$ at the fulcra A, B and C as based on the applied force F in FIG. 1 are converted into electric signals by force detectors 2a, 2b and 2c respectively. Further, the electric signals are amplified by amplifiers 5a, 5b and 5c and are thereafter added by an adder 60. The result of the addition is compared with a threshold voltage $V_{REF}$ in a comparator 70. When the added result has become greater than $V_{REF}$ with the increase of the applied force F, a flip-flop 80 (hereinbelow, abbreviated to "FF 80") is set. The set output of the FF 80 becomes a calculation start command signal (START) for a computer 103 in a calculator 10. Upon receiving the start signal, the computer 103 transmits a signal indicating that the calculations can be started (READY), to an analog-to-digital converter (hereinbelow, termed "ADC") 102. Upon receiving the ready signal, the ADC 102 samples and holds the output signals (D) of the amplifiers, subjects them to the A/D conversion and starts the calculations for evaluating X and Y. When the calculations have ended, the FF 80 is reset by a control signal from the computer 103, and the ADC 102 is disconnected from the computer 103.

Figure 10:
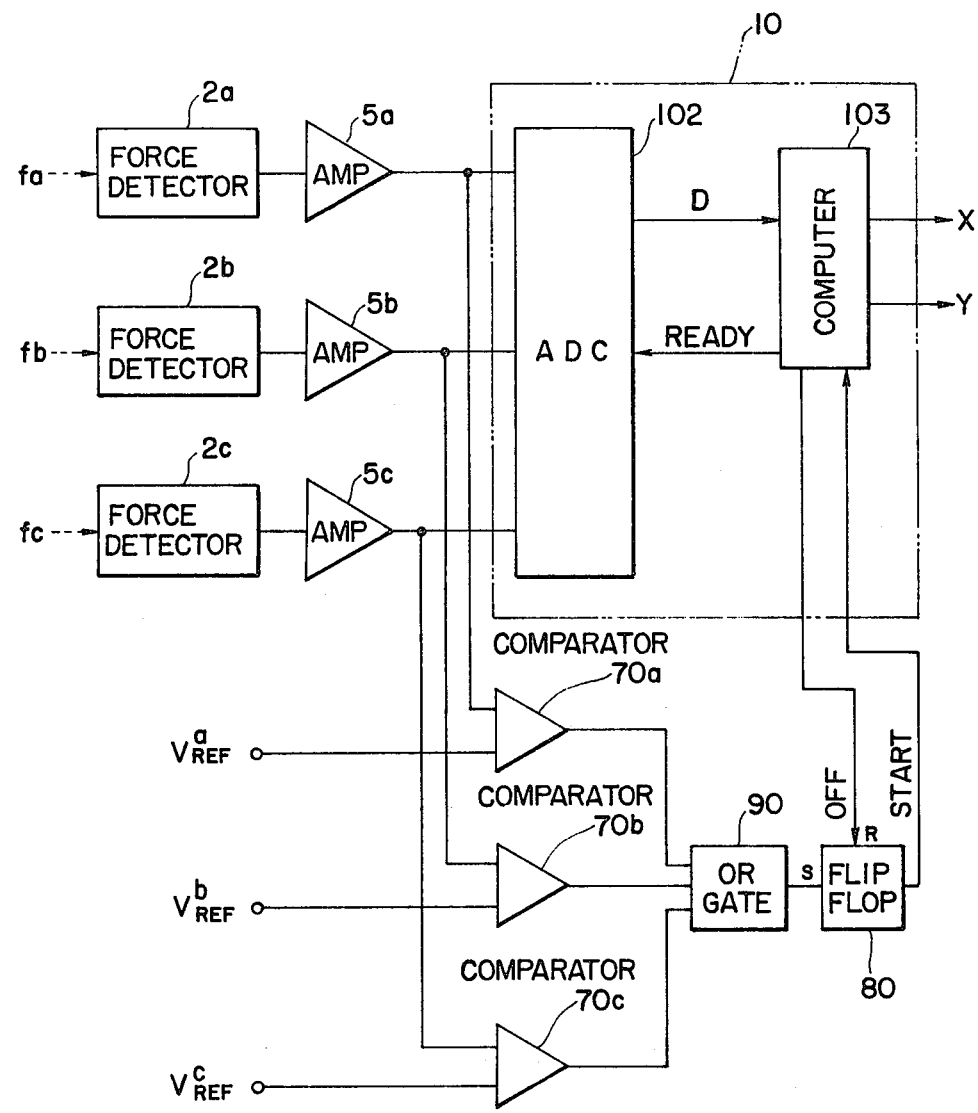
FIG. 10 is a diagram showing the circuit arrangement of a sixth embodiment of this invention.

FIG. 10 is a circuit diagram showing a sixth embodiment of this invention, in which threshold values are provided independently for the component forces $f_a$, $f_b$ and $f_c$ at the respective fulcra of the applied force F.

The respective outputs of the amplifiers 5a, 5b and 5c are compared with the threshold voltages $V_{REF}{}^a$, $V_{REF}{}^b$ and $V_{REF}{}^c$ independent of one another (which may well have values equal to one another) in comparators 70a, 70b and 70c.

When, with the increase of the applied force F, the component forces $f_a$, $f_b$ and $f_c$ have increased and have become greater than values corresponding to the respective threshold voltages, the outputs of the corresponding comparators 70a, 70b and 70c become "1".

When the output of at least one comparator has become "1", the FF 80 is set by an output of a logic gate 90 constructed as a three-input OR gate.

It can be readily realized by altering the logic gate 90 that the FF 80 is set when the output of the comparator corresponding to the maximum threshold voltage has become "1". The processings after the FF 80 has been set are quite the same as in the case of the first embodiment.

In the above two embodiments, it is also allowed that the adder 60, the comparator 70 (comparators 70a–70c), the logic gate 90 and the FF 80 are not disposed, that the signals digitalized by the ADC 102 are applied to the computer 103, that the processings of addition and comparison are executed in accordance with a computer program, and that when the added result has become greater than the value corresponding to the threshold voltage $V_{REF}$, the calculations for evaluating X and Y are carried out. Further, it is possible that an analog calculator is disposed instead of the ADC 102 as well as the computer 103, that the outputs of the amplifiers 5a, 5b and 5c are directly applied to the analog calculator, and that the calculations for evaluating X and Y are executed when the analog calculator has received a signal corresponding to the "on" output of the FF 80 indicating that a signal corresponding to the output of the adder 60 has exceeded the threshold voltage $V_{REF}$.

In the above two embodiments, the calculations are started whenever the fixed force F determined by the threshold voltage has been applied. Therefore, when the threshold voltage is set in advance at such extent of value that the amplifiers 5a–5c and the ADC 102 are not saturated, the errors of X and Y can be suppressed below a specified value. In addition, malfunctions due to minute inputs based on vibrations, a wind pressure etc. can be eliminated.

Figure 11:
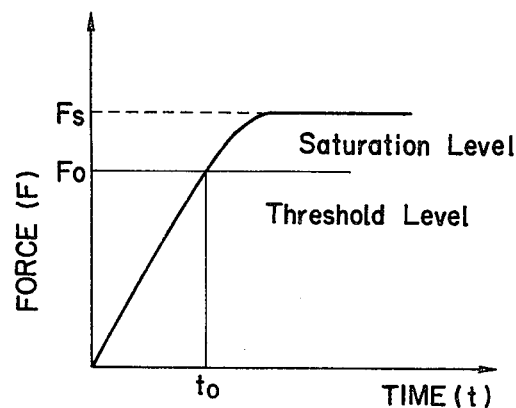
FIG. 11 is a graph showing the relationship between the magnitude of an applied force and the timing at which the calculation of coordinates is started.

Further, even in case where a force $F_s$ great enough to saturate the amplifiers 5a–5c and the ADC 102 has been applied, analog signals are sampled and held at a timing $t_o$ before the saturation, to start the calculations for evaluating the coordinates, by selecting the applied force $F_o$ corresponding to the threshold voltage so as to establish $F_o < F_s$ as illustrated in FIG. 11. Therefore, the errors of X and Y can be suppressed below a specified value without regard to the magnitude of the applied force.

Figure 12:
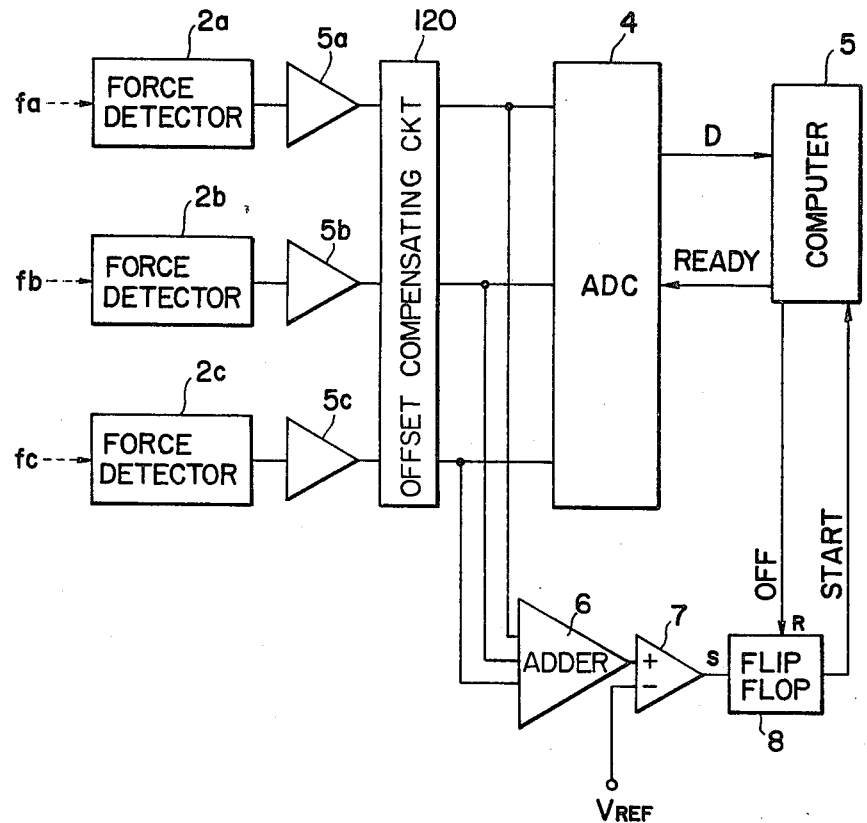
FIG. 12 is a diagram showing the circuit arrangement of a seventh embodiment of this invention.

Needless to say, it is also allowed that as illustrated in FIG. 12, the output signals of the amplifiers 5a–5c are subjected to the offset compensations stated in Item (i) by means of an offset compensation circuit 120 including an offset memory etc., whereupon the calculations of the coordinates are started at the timing $t_o$ of the application of the force $F_o$. As a result, the coordinates calculations with further lessened errors become possible.

As apparent from the above description in Items (i) and (ii), according to this invention, a touch sensitive tablet using force detection (touch panel) of high precision can be realized.

What is claimed is:

1. A touch sensitive tablet using force detection wherein magnitudes of component forces at three fulcra, of an external force applied to one point on a faceplate are detected so as to evaluate coordinates of the point to which the external force has been applied; comprising conversion means to convert the component forces at each fulcrum into electric signals, sensing means to sense that no force components are present at each fulcrum as an indication that no force is applied, memory means to store the output signals of said conversion means at each fulcrum as offset values at, at least, one point of time in the period in which no force is applied, control means to control writing of the output signals of said conversion means into said memory means upon receiving an output of said sensing means, subtraction means to subtract outputs of said memory means from the outputs of said conversion means at each fulcrum, and calculation means to execute calculations for evaluating the coordinates of the point to which the external force has been applied, the outputs of said subtraction means in accordance with the output of said sensing means.

2. A tablet according to claim 1, wherein said sensing means comprises means to sense the absence of an induced noise based on a commercial frequency as transmitted to said faceplate through a part of a human body having contact with said faceplate.

3. A tablet according to claim 1, wherein said sensing means comprises comparison means to compare each output of said subtraction means with a predetermined threshold value.

4. A tablet according to claim 1, wherein said sensing means comprises addition means to evaluate a summation of the output signals of said subtraction means at the three fulcra, and comparison means to compare the summation with a predetermined threshold value.

5. A tablet according to claim 1, wherein said memory means includes delay means to delay the output signals of said conversion means no longer than a predetermined time and to store the delayed outputs as the offset values.

6. A tablet according to claim 3, wherein said comparison means includes at least one register means for temporarily storing the output signals of said subtraction means.

7. A tablet according to claim 1, wherein said sensing means comprises at least two register means connected in cascade on an output side of said conversion means, subtraction means to evaluate output differences for combinations of two outputs of said register means differing from each other, and sensor means to sense that the force is not applied, on the basis of the output differences.

8. A tablet according to claim 7, wherein said sensing means further comprises addition means to evaluate a summation of the output differences of the register means at the three fulcra, calculation means to evaluate an absolute value of the summation, and comparison means to compare the absolute value with a predetermined threshold value.

9. A tablet according to claim 1, wherein said sensing means comprises calculation means to evaluate an absolute value of the output difference of the register means, and comparison means to compare the absolute value with a predetermined threshold value.

10. A tablet according to claim 1, wherein said control means enable the writing of the output signals of said conversion means as offset values into said memory means until said sensing means senses that a force is applied to the faceplate.

11. A tablet according to claim 10, wherein said control means enable continuous renewal of the stored offset values written into said memory means at a predetermined timing rate until said sensing means senses that a force is applied to the faceplate.

* * * * *